United States Patent [19]

Seto

[11] Patent Number: 4,754,144
[45] Date of Patent: Jun. 28, 1988

[54] RADIATION IMAGE READ-OUT APPARATUS

[75] Inventor: Hisao Seto, Kanagawa, Japan

[73] Assignee: Fuji Photo Film Co., Ltd., Kanagawa, Japan

[21] Appl. No.: 933,955

[22] Filed: Nov. 24, 1986

[30] Foreign Application Priority Data

Nov. 25, 1986 [JP] Japan .................................. 60-264482

[51] Int. Cl.$^4$ ............................................. G01T 1/105
[52] U.S. Cl. ............................... 250/484.1; 250/327.2
[58] Field of Search ........................... 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,543,479 | 9/1985 | Kato | 250/327.2 |

FOREIGN PATENT DOCUMENTS 0011395 2/1981 Japan .................................. 250/327.2

*Primary Examiner*—Howell Janice A.
*Assistant Examiner*—Constantine Hannaher
*Attorney, Agent, or Firm*—Sughrue, Mion, Zinn, Macpeak & Seas

[57] ABSTRACT

An apparatus for reading out a radiation image stored on a stimulable phosphor sheet comprises a read-out section, an erasing section, and a section for releasably holding a cassette which is capable of housing the stimulable phosphor sheet and which has one openable end, and provided with a roller for taking the stimulable phosphor sheet out of the cassette and inserting it thereinto. The apparatus also comprises a sheet conveyance system for receiving the stimulable phosphor sheet taken out of the cassette by the roller, conveying the stimulable phosphor sheet to read-out section and the erasing section, and then transferring the stimulable phosphor sheet to the roller to have the stimulable phosphor sheet housed in the cassette at the cassette holding section. The sheet conveyance distance from the leading end of the cassette, which is held at the cassette holding section, as viewed in a cassette feeding direction to a scanning position of stimulating rays at the read-out section is shorter tha the length of the stimulable phosphor sheet in the conveyance direction.

5 Claims, 4 Drawing Sheets

RADIATION IMAGE READ-OUT APPARATUS

BACKGROUND OF THE INVENTION

1. Field of the Invention

This invention relates to a radiation image read-out apparatus for use in a radiation image recording and reproducing system. This invention particularly relates to a radiation image read-out apparatus wherein a read-out section and an erasing section are combined integrally.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays for reading out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

In the proposed radiation image read-out apparatus, a cassette housing a stimulable phosphor sheet carrying a radiation image stored thereon by use of an external image recording apparatus is fed to a cassette holding section, and the stimulable phosphor sheet is taken out of the cassette and sent to the read-out section for reading out the radiation image. After the image read-out is finished, the sheet is sent to the erasing section where radiation energy remaining on the sheet is erased. The erased sheet is taken out of the read-out section and reused for image recording.

The aforesaid radiation image read-out apparatus is desired to be fabricated in a small size so that it can be used in a limited space. Accordingly, there have been proposed various read-out apparatuses whose sizes are made small by devising, for example, the layout of the read-out section, the erasing section or the like.

As for the radiation image read-out, there has heretofore been known a method wherein preliminary read-out for approximately ascertaining the radiation image stored on a stimulable phosphor sheet is conducted prior to the aforesaid image read-out (final read-out) for obtaining an electric image signal for use in reproduction of a visible image, image read-out conditions for the final read-out or the like are adjusted based on the information obtained by the preliminary read-out, and the final read-out is carried out by use of the adjusted read-out conditions.

As disclosed, for example, in Japanese Unexamined Patent Publication No. 58(1983)-67240, the preliminary readout may be conducted by scanning the stimulable phosphor sheet with stimulating rays having stimulation energy of a level lower than the level of the stimulation energy of the stimulating rays used in the final read-out, and detecting the light emitted by the stimulable phosphor sheet during the scanning by a photoelectric read-out means.

In order to conduct the preliminary read-out, a read-out section for the preliminary read-out may be provided independently of the read-out section for the final read-out. However, in this case, since two laser beam sources and two photoelectric read-out means are necessary, the manufacturing cost of the apparatus becomes high. In order to eliminate this problem, there has heretofore been used a read-out method wherein the preliminary read-out is conducted by conveying a stimulable phosphor sheet by use of a conveyance means and scanning the overall surface of the stimulable phosphor sheet with stimulating rays at a read-out section for the final read-out, then the conveyance means is switched back to return the stimulable phosphor sheet up to the scanning start position, and the final read-out is conducted by conveying the stimulable phosphor sheet in the same direction as when the preliminary read-out was conducted. However, in the case where the image read-out is carried out in this manner, since the stimulable phosphor sheet conveyed for conducting the preliminary read-out must be switched back and returned to the scanning start position, the length of the read-out section in the sheet conveyance direction must be at least equal to the total length of two stimulable phosphor sheets (i.e. the length of one stimulable phosphor sheet before the scanning position of stimulating rays plus the length of one stimulable phosphor sheet after the scanning position thereof). Thus the read-out section becomes large. Accordingly, in the case where the read-out apparatus is designed so that the preliminary read-out may be conducted, since the read-out section becomes large and consequently the read-out apparatus becomes large as a whole, it is not always possible to substantially satisfy the requirement of minimizing the size of the read-out apparatus.

SUMMARY OF THE INVENTION

The primary object of the present invention is to provide a radiation image read-out apparatus which comprises a small read-out section and is compact as a whole, and wherein preliminary read-out and final read-out may be conducted at a single read-out section.

Another object of the present invention is to provide a radiation image read-out apparatus which markedly facilitates processing of a stimulable phosphor sheet.

The present invention provides a radiation image read-out apparatus comprising:

(i) a read-out section for reading out a radiation image stored on a stimulable phosphor sheet by scanning said stimulable phosphor sheet with stimulating rays, (ii) an erasing section for erasing radiation energy remaining on said stimulable phosphor sheet after image readout from said stimulable phosphor sheet is finished, (iii) a cassette holding section for releasably holding a cassette which is capable of housing said stimulable phosphor sheet therein and which has one openable end, and provided with a sheet movement means for taking said stimulable phosphor sheet out of said cassette and inserting it into said cassette, and (iv) a sheet conveyance means for receiving said stimulable phosphor sheet taken out of said cassette by said sheet movement means, conveying said stimulable phosphor sheet to said read-out section and said erasing section, and thereafter transferring said stimulable phosphor sheet to said sheet movement means to have said stimulable phosphor sheet housed in said cassette at said cassette holding section, wherein a conveyance distance of said stimulable phosphor sheet from the leading end of said cassette, which is held at said cassette holding section, as viewed in a cassette feeding direction to a scanning position of said stimulating rays at said read-out section is shorter than the length of said stimulable phosphor sheet in the conveyance direction.

With the radiation image read-out apparatus in accordance with the present invention, since the sheet conveyance distance from the scanning position of stimulating rays at the read-out section to the leading end of the cassette as viewed in the cassette feeding direction is adjusted to be shorter than the length of the stimulable phosphor sheet in the conveyance direction, it is possible to fabricate the read-out section in a small size and to make the read-out apparatus compact as a whole. Also, since the cassette is fed comparatively close to the scanning position at the read-out section, in the case where preliminary read-out is conducted, it is possible to utilize the space in the cassette as a space for allowing the stimulable phosphor sheet to move when the stimulable phosphor sheet is conveyed by switch-back or in some other manner. Therefore, it becomes possible to conduct the preliminary read-out and the final read-out at the read-out section without causing the read-out section to become large. Further, after image read-out and erasing are finished for the stimulable phosphor sheet taken out of the cassette, the stimulable phosphor sheet may be returned into the cassette and reused for image recording. Accordingly, processing of the stimulable phosphor sheet becomes very easy.

DESCRIPTION OF THE PREFERRED EMBODIMENTS

The present invention will hereinbelow be described in further detail with reference to the accompanying drawings.

Figure 1:
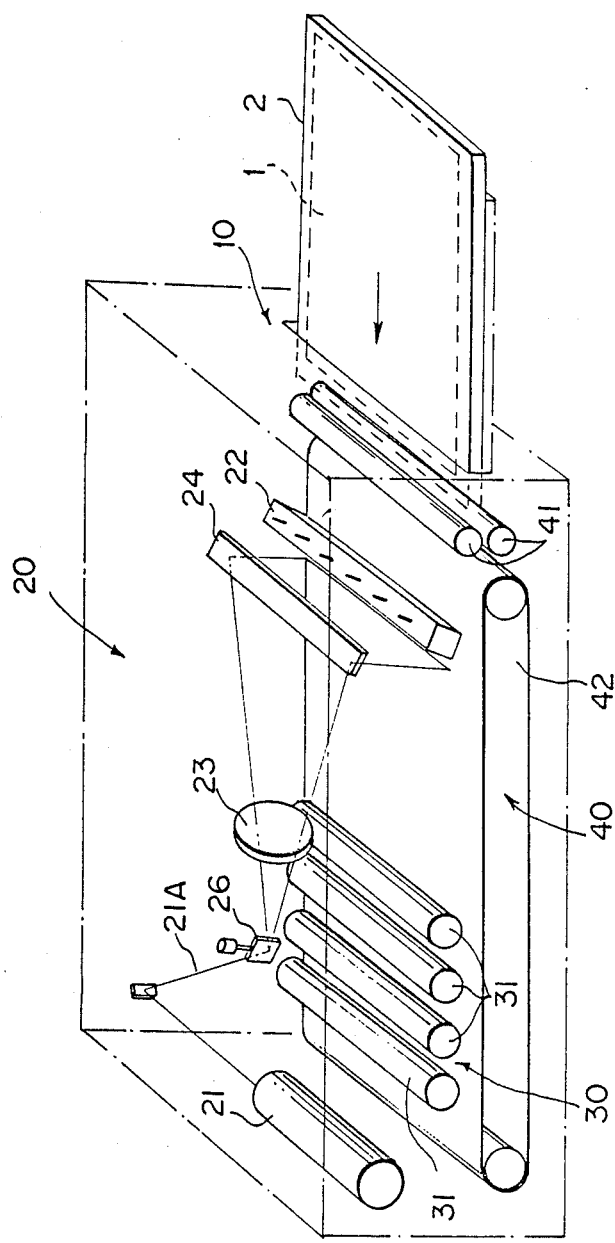
FIG. 1 is a perspective view showing the configuration of an embodiment of the radiation image read-out apparatus in with the present invention.
Figure 2:
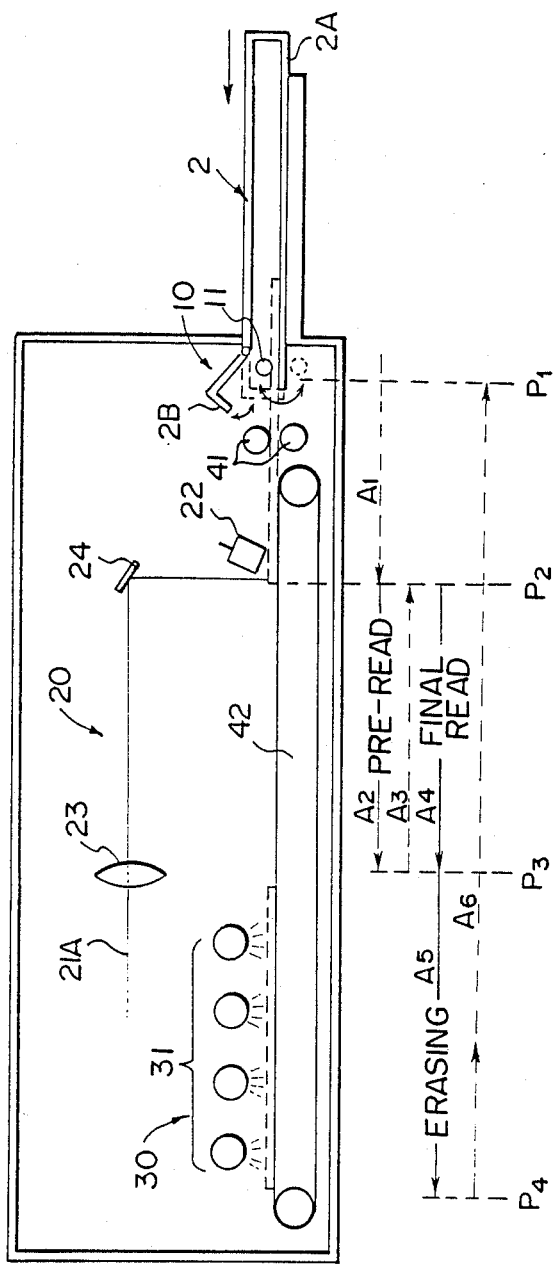
FIG. 2 is a conceptual side view showing the embodiment of FIG. 1.

Referring to FIGS. 1 and 2, an embodiment of the radiation image read-out apparatus in accordance with the present invention is provided with a cassette holding section 10 for releasably holding a cassette 2 capable of housing a stimulable phosphor sheet (hereinafter simply referred to as a sheet) 1 therein, a read-out section 20 for reading out a radiation image stored on the sheet 1, and an erasing section 30 for erasing radiation energy remaining on the sheet 1 after image read-out is conducted thereon. This embodiment is also provided with a sheet conveyance means 40 constituted by conveyor rollers 41, 41 and an endless belt 42 for receiving the sheet 1 taken out of the cassette 2 and conveying it to the read-out section 20 and the erasing section 30.

The sheet 1 is subjected to image recording in an external image recording apparatus (not shown) in the form housed in the cassette 2, and the cassette 2 housing the sheet 1 carrying a radiation image stored thereon is fed to the cassette holding section 10 in the horizontal direction as indicated by the arrow. As shown in FIG. 2, the cassette 2 comprises a cassette body 2A and an openable cover member 2B provided at the leading end of the cassette 2 as viewed in the inserting direction to the cassette holding section 10. When the cassette 2 is fed to the cassette holding section 10, the cover member 2B is rotated from a closed position as indicated by the broken line to an opened position as indicated by the solid line. The cassette holding section 10 is provided with a roller 11 as a sheet movement means for taking the sheet 1 out of the cassette 2 and inserting the sheet 1 into the cassette 2. When the cover member 2B of the cassette 2 arrives at the opened position, the roller 11 is moved from a first position as indicated by the broken line to a second position as indicated by the solid line, and is rotated in contact with the sheet 1 to convey it out of the cassette 2.

When the cassette 2 housing the sheet 1 is fed to the cassette holding section 10, the leading end of the sheet 1 housed in the cassette 2 is disposed at a position P1. The roller 11 starts conveyance of the sheet 1 out of the cassette 2 by rotating in contact with the portion of the sheet 1 in the vicinity of the leading end thereof as mentioned above, and transfers the sheet 1 to the conveyor rollers 41, 41. The sheet 1 is conveyed to the read-out section 20 by the conveyor rollers 41, 41 and the endless belt 42.

Figure 3A:
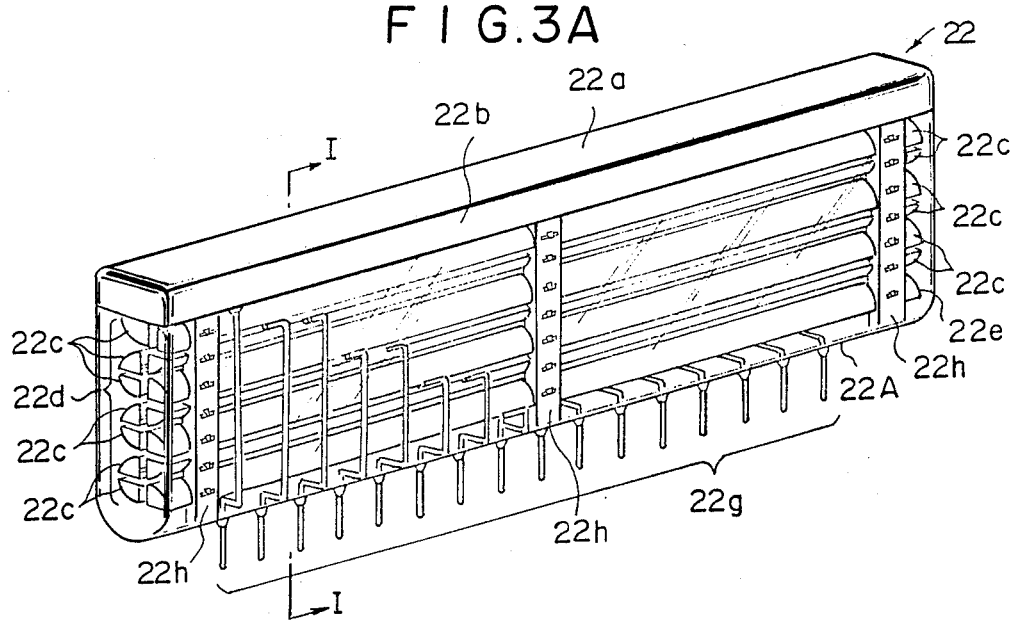
FIG. 3A is a perspective view showing a long photomultiplier the embodiment of FIG. 1.
Figure 3B:
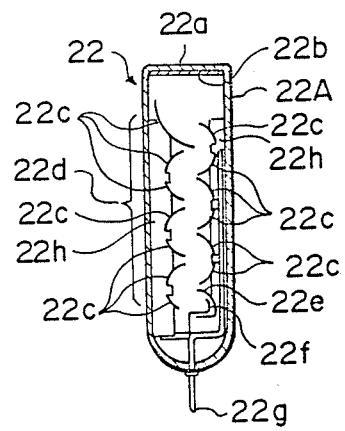
FIG. 3B is a sectional view taken along line I—I of FIG. 3A.

At the read-out section 20, the sheet 1 carrying a radiation image stored thereon is scanned with stimulating rays 21A such as a laser beam which are emitted by a laser beam source 21 and which cause the sheet 1 to emit light in proportion to the stored radiation energy, and the emitted light is photoelectrically detected by a long photomultiplier 22 acting as a photoelectric read-out means to obtain an electric image signal for use in reproduction of a visible image. Reference numeral 26 denotes a light deflector such as a galvanometer mirror, reference numeral 23 denotes a scanning lens such as an $f\theta$ lens, and reference numeral 24 denotes a mirror for reflecting the stimulating rays 21A onto the sheet 1. By way of example, the long photomultiplier 22 has an electrode configuration generally called the box type as shown in FIGS. 3A and 3B. The photomultiplier 22 comprises a vacuum body 22A fabricated of glass or the like, a photocathode (photoelectric face) 22b positioned to face a long light receiving face 22a for emitting photoelectrons in the vacuum body 22A, and a multiplying section 22d positioned under the photocathode 22b in the vacuum body 22A and including a plurality (13 pieces in this embodiment) of electrodes (dynodes 22c, 22c, ...) having a quarter cylinder shape and exhibiting the secondary electron emission effect. A shield electrode 22e is disposed to face the lowermost dynode 22c of the multiplying section 22d, and an anode 22f for collecting the electron streams multiplied by the multiplying section 22d and generating a signal is disposed inside of the shield electrode 22e. These electrodes are respectively connected electrically in a one-to-one relation with terminals of a terminal group 22g positioned on the side opposite to the light receiving face 22a in a number equal to the number of the electrodes. The dynodes 22c, 22c, ... and the shield electrodes 22e are secured inside of the body 22A by supporting members 22h, 22h, 22h, fabricated of an insulating material.

Figure 4:
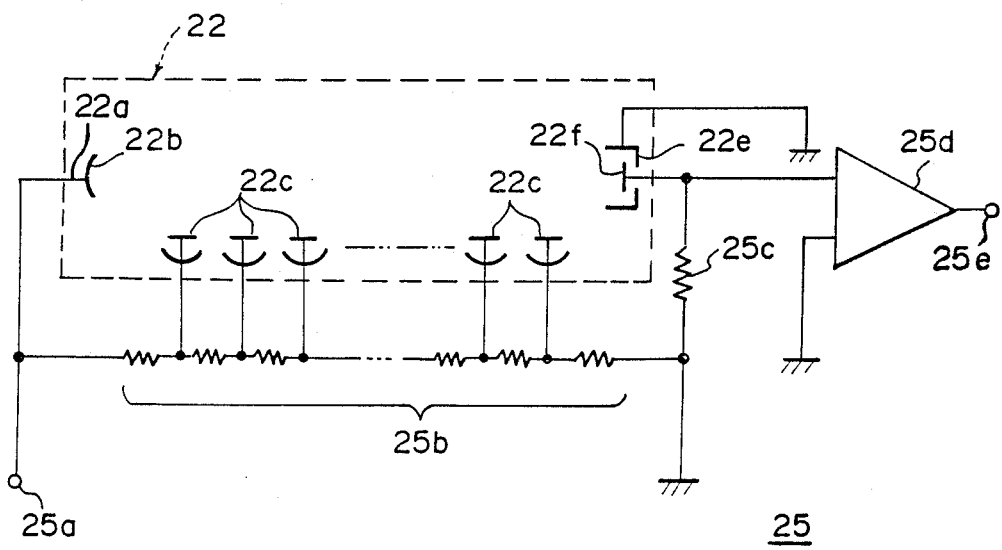
FIG. 4 is a circuit diagram showing the drive circuit of the photomultiplier shown in FIG. 3A.

FIG. 4 shows an electric circuit 25 for operating the photomultiplier 22 and obtaining a photoelectric output. In FIG. 4, similar elements are numbered with the same reference numerals with respect to FIG. 3A. A high negative voltage is applied to the photocathode 22b via a high negative voltage applying terminal 25a. The high negative voltage applied to the high negative voltage applying terminal 25a is divided by a bleeder resistance group 25b into voltages which are applied respectively to the dynodes 22c, 22c, .... The shield electrode 22e is grounded, and the anode 22f is grounded via a resistor 25c and is connected with one of terminals of an amplifier 25d. The other terminal of the amplifier 25d is grounded. The photoelectrically converted image information is obtained as an electric signal from an output terminal 25e of the amplifier 25d.

It is advantageous for minimizing the size of the read-out section 20 that the long photomultiplier be used as the photoelectric read-out means. However, it is also possible to use a photoelectric read-out means wherein the light emitted by the sheet 1 is guided via a known transparent light guide member to a comparatively small photomultiplier, a line sensor, or the like. The long photomultiplier may also be fabricated by extending a photomultiplier provided with a multiplying section having another known electrode configuration such as a venetian blind type, or a multiplying section formed by combining different types of electrodes.

The sheet 1 is conveyed by the sheet conveyance means 40 in the direction as indicated by the arrow A1 shown in FIG. 2. When the leading end of the sheet 1 arrives at a position P2, i.e. the scanning position of the stimulating rays 21A, it becomes possible to conduct image read-out by scanning with the stimulating rays 21A. On the other hand, the conveyance distance of the sheet 1 from the leading end of the cassette 2 held at the cassette holding section 10 as viewed in the cassette inserting direction to the scanning position P2 is adjusted to be shorter than the length of the sheet 1 in the conveyance direction. As indicated by the broken line in FIG. 2, when the leading end of the sheet 1 is disposed at the position P2, the portion of the sheet 1 in the vicinity of the rear end thereof remains inside of the cassette 2. Therefore, image read-out from the sheet 1 is started before the sheet 1 is completely conveyed out of the cassette 2. In the case where the preliminary read-out is conducted prior to the final read-out at the read-out section 20, the preliminary read-out is carried out by exposing the sheet 1 to the stimulating rays 22A while the leading end of the sheet 1 is moved from the position P2 to a position P3 in the direction as indicated by the arrow A2.

When the preliminary read-out is finished in this manner, the endless belt 42 and the conveyor rollers 41, 41 are rotated reversely to convey the sheet 1 in the direction as indicated by the arrow A3 until the leading end of the sheet 1 returns from the position P3 to the position P2. After the sheet 1 is returned to the scanning start position where the leading end thereof is disposed at the position P2, the sheet 1 is conveyed in the direction as indicated by the arrow A4, and the final read-out is carried out during the sheet conveyance. As mentioned above, in this embodiment, the cassette 2 is fed to the position comparatively close to the read-out section 20. Therefore, the space inside of the cassette 2 is utilized as a space for allowing the movement of the sheet 1 when the sheet 1 is switched back from the read-out section 20 after being subjected to the preliminary read-out and again conveyed to the read-out section 20. The final read-out conducted by exposing the sheet 1 to the stimulating rays 21A is started with the rear end of the sheet 1 remaining inside of the cassette 2. Thus since the space inside of the cassette 2 is utilized as a space for allowing the movement of the sheet 1 in this embodiment, it becomes unnecessary to provide a space for disposing one sheet 1 prior to the scanning position of the stimulating rays in the read-out section as in the conventional apparatus, and it becomes possible to minimize the read-out section even though the preliminary read-out is to be conducted at the read-out section.

After the image read-out from the sheet 1 is finished at the read-out section 20, the sheet 1 is conveyed by the endless belt 42 in the direction as indicated by the arrow A5 to the erasing section 30. The erasing section 30 is disposed under the optical path of the stimulating rays 21A emitted by the laser beam source 21 and adjacent to the read-out section 20 so that erasing may be conducted without causing the read-out apparatus to become large.

At the erasing section 30, radiation energy remaining on the sheet 1 after the image read-out is erased. Specifically, though most part of the radiation energy stored on the sheet 1 at the image recording step is released during the image read-out, a part of the stored radiation energy remains stored thereon after the image read-out. In order to reuse the sheet 1, the residual radiation energy is erased at the erasing section 30. For this purpose, any erasing method may be used. In this embodiment, the erasing section 30 is provided with a plurality of erasing light sources 31, 31, ... constituted by fluorescent lamps, tungsten-filament lamps, sodium lamps, xenon lamps, iodine lamps or the like. The sheet 1 is conveyed in the direction as indicated by the arrow A5 to the position under the erasing light sources 31, 31, ... where the leading end of the sheet 1 is disposed at a position P4, and exposed to erasing light emitted by the erasing light sources 31, 31, ... for releasing the residual radiation energy from the sheet 1. The erasing light sources 31, 31, ... are turned on only when the sheet 1 is present at the erasing section 30, and are turned off when the sheet 1 is present at the read-out section 20 or the like. Therefore, the image read-out is not adversely affected by the erasing light emitted by the erasing light sources 31, 31, . . . .

After the erasing is finished, the endless belt 42 is rotated reversely to convey the sheet 1 in the direction as indicated by the arrow A6 and transfer it to the conveyor rollers 41, 41. The sheet 1 is then moved by the conveyor rollers 41, 41 into the cassette 2. The roller 11 at its second position in the cassette 2 is rotated reversely to the direction when the sheet 1 was conveyed out of the cassette 2. Thus the sheet 1 is completely conveyed into the cassette 2 by the conveyor rollers 41, 41. Thereafter, the roller 11 is returned to its first position for allowing feeding of the next cassette. The cover member 2B of the cassette 2 is returned to the closed position, and the cassette 2 is taken out of the cassette holding section 10.

The layouts of the cassette holding section, the read-out section, the erasing section and the other members of the radiation image read-out apparatus in accordance with the present invention are not limited to those in the aforesaid embodiment, and the conveyance direction of the sheet 1 need not necessarily be the predetermined linear direction. Since the erasing light sources 31, 31, . . . at the erasing section 30 are turned on only when the erasing is to be conducted, it is also possible to dispose the erasing section immediately after the scanning position of the stimulating rays 21A. In this case, it becomes possible to make the read-out apparatus smaller. Also, the sheet conveyance means for returning the sheet 1 from the erasing section to the cassette need not necessarily be common to the sheet conveyance means for conveying the sheet 1 to the erasing section, and it is possible to return the sheet 1 to the cassette by use of an independent sheet conveyance means.

I claim:

1. A radiation image read-out apparatus comprising:
   (i) a read-out section for reading out a radiation image stored on a stimulable phosphor sheet by scanning said stimulable phosphor sheet with stimulating rays,
   (ii) an erasing section for erasing radiation energy remaining on said stimulable phosphor sheet after image readout from said stimulable phosphor sheet is finished,
   (iii) a cassette holding section for releasably holding a cassette which is capable of housing said stimulable phosphor sheet therein and which has one openable end, and provided with a sheet movement means for taking said stimulable phosphor sheet out of said cassette and inserting it into said cassette, and
   (iv) a sheet conveyance means for receiving said stimulable phosphor sheet taken out of said cassette by said sheet movement means, conveying said stimulable phosphor sheet to said read-out section and said erasing section, and thereafter transferring said stimulable phosphor sheet to said sheet movement means to have said stimulable phosphor sheet housed in said cassette at said cassette holding section,
   wherein a conveyance distance of said stimulable phosphor sheet from the leading end of said cassette, which is held at said cassette holding section, as viewed in a cassette feeding direction to a scanning position of said stimulating rays at said read-out section is shorter than the length of said stimulable phosphor sheet in the conveyance direction.

2. An apparatus as defined in claim 1 wherein said sheet movement means at said cassette holding section comprises a roller moveable between a first position retracted from said cassette and a second position where said roller is advanced into said cassette and contacts said stimulable phosphor sheet housed in said cassette.

3. An apparatus as defined in claim 1 wherein said sheet conveyance means comprises a pair of conveyor rollers disposed in the vicinity of said cassette holding section, and an endless belt for receiving said stimulable phosphor sheet from said conveyor rollers and transferring it to said conveyor rollers.

4. An apparatus as defined in claim 1 wherein said read-out section is provided with a long photomultiplier for photoelectrically detecting light emitted by said stimulable phosphor sheet when said stimulable phosphor sheet is scanned with said stimulating rays.

5. An apparatus as defined in claim 1 wherein said stimulating rays are a laser beam.

* * * * *